E. E. SWEET.
WINDOW OPERATING MEANS.
APPLICATION FILED OCT. 15, 1913.
1,098,414.
Patented June 2, 1914.
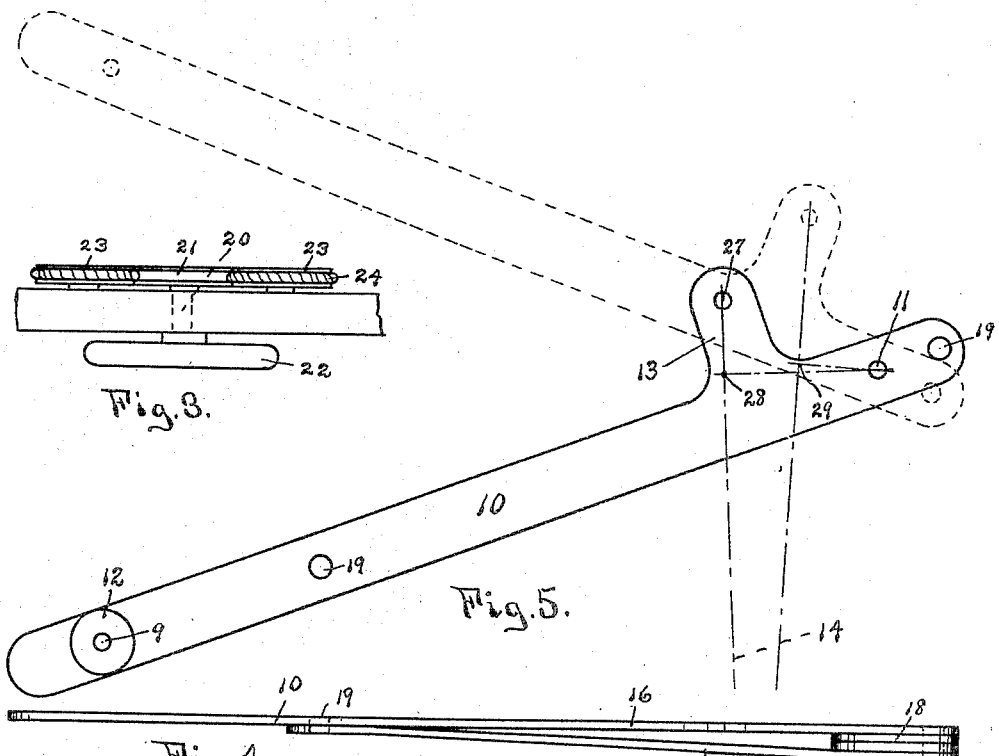
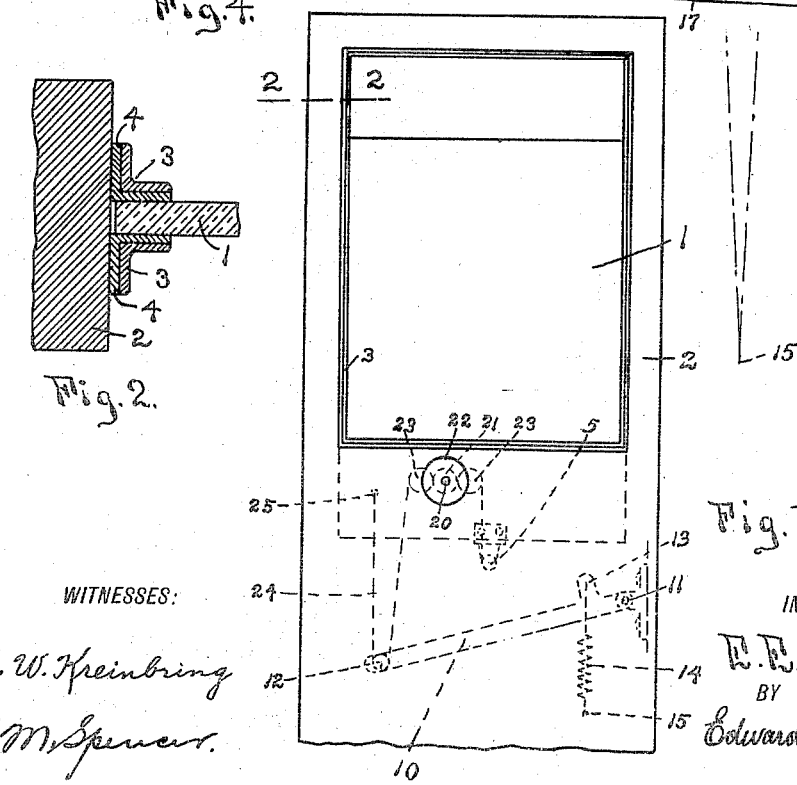
WITNESSES:
H. W. Kreinbring
L. M. Spencer
INVENTOR
E. E. Sweet
BY
Edward N. Pagelsen,
ATTORNEY

UNITED STATES PATENT OFFICE.

ERNEST E. SWEET, OF DETROIT, MICHIGAN.

WINDOW-OPERATING MEANS.

1,098,414. Specification of Letters Patent. Patented June 2, 1914.

Application filed October 15, 1913. Serial No. 795,198.

*To all whom it may concern:*

Be it known that I, ERNEST E. SWEET, a citizen of the United States, and a resident of Detroit, in the county of Wayne and State of Michigan, have invented a new and Improved Window-Operating Means, of which the following is a specification.

This invention relates primarily to operating means for slidable loads, and its object is to provide mechanism whereby compensation is made for the varying tension of a balancing spring, thereby insuring a substantially uniform counterbalancing of the load on the spring in all positions.

It relates particularly to the application of such a device to the slidable windows of vehicles, especially to the windows of automobile doors.

This invention consists in a counterbalancing mechanism that comprises a lever having a portion offset from the line joining its ends, to which portion the counterbalancing spring is attached, in combination with the spring and means for connecting the lever to the load to be carried or the element to be actuated.

In the drawings, Figure 1 is a side view of an automobile door, the window operating mechanism within the door being shown in dotted lines. Fig. 2 is a section of the door on line 2—2 of Fig. 1. Fig. 3 is a detail plan view of the several wheels and an operating hand wheel or button that may be used in this device. Fig. 4 is a plan of the lever, and Fig. 5 is a side view thereof, the dotted lines showing the lever in a second position.

Similar reference characters refer to like parts throughout the several views.

In the drawings, 1 indicates a sheet of plate glass which is mounted in the door 2 of an automobile or other structure, which may be of any desired construction, but preferably of two thicknesses spaced apart to permit the glass to slide up and down. The door is shown to have an opening, and to the door, around within the opening, may be secured the angle bars 3, between which and the door the packing strips 4 may be held. Any other guide may be substituted for that shown, or the guides may be omitted altogether if desired. An attachment 5 may be secured to the lower edge of the glass.

A lever 10 is mounted between the thicknesses of the door at any desired point, preferably by means of a pivot 11 secured to the edge strips of the door. The opposite end of the lever may carry a roller or pulley 12 on the pin 9, and be provided between its ends with a portion 13, offset from the line joining the pivots 9 and 11. A tension spring 14 has one end secured to the door at 15, and its opposite end is attached to the offset portion 13 as indicated in Fig. 1.

The lever 10 is shown as made up of the bars 16 and 17, spaced apart at one end by the fillers 18, and secured together by the rivets 19. Any construction of lever may, however, be used, so long as it includes a portion that is offset or bent out from the line of the lever. It will be apparent that this tension spring on the lower side of the lever is the equivalent for a properly positioned and proportioned compression spring on the other side of the lever.

At any convenient point on the door is mounted a freely revoluble shaft 20, having secured thereon at one end a friction wheel 21, and at the opposite end a hand wheel 22 or other device whereby the shaft may be turned. Adjacent the wheel 21 and on either side thereof, and preferably in the same plane, are two similar wheels 23, mounted to revolve freely. A cable or other flexible connector 24 is secured to the door at 25 and passes around the pulley 12, then over one of the wheels 23, under the wheel 21, over the other wheel 23, and is finally secured to the attaching bracket 5.

Operation:—It will be seen that the weight of the window pane 1 is transmitted to the spring 14 by means of the cable 24 and lever 10. A spring may obviously be selected of such strength that at some particular point the window will be given a tendency to close or to open or to remain at the point indicated, as desired. It is apparent also that this tendency of the window to close or to open or to remain stationary will be disturbed, when the window is raised or lowered, by the increased or decreased stress of the spring, unless mechanism is provided to compensate for such changes. The effective lever arm of the spring in any position is the perpendicular distance from the pivot 11 to the center line of the spring, that is, the line between the points 15 and 27, as indicated in Fig. 5. The point of attachment 27 of the spring to the lever, as therein shown, is some distance above the point 28 at which the perpendicular let fall from point 11 to the line 15—27 of the spring intersects that line, and the exact distance selected will depend on the strength of spring used. It is apparent that as the lever swings up and thereby increases the stress of the spring, the point of attachment of the spring to the lever will swing over to the right in Fig. 5, which will cause a shortening of the effective lever arm of the spring, and thereby tend to compensate for the increased stress of the spring. If the point of attachment of the spring to the lever is selected so that the power arm makes a proper acute angle with the load arm of the lever, the relation of the effective action of the spring to the load, that is, the weight of the window, will remain substantially constant. The result of proper proportioning of the load and power arms of the lever, the angle between these arms, and the length and strength of the spring will be that the downward pull of the roller 12 on the cable 24 will remain the same during the time the lever 10 swings through a predetermined arc, that is, from the position shown in solid lines in Fig. 5 to that shown in dotted lines. The stress of the spring multiplied by the distance 11—28 will have the same effect on the cable as the increased stress of the spring multiplied by the decreased distance 11—29. It will be apparent that by moving the point 27 of attachment of the spring toward the point 15 along the line 27—15, the lever arm 28—11 will decrease more slowly than the stress of the spring increases, which will result in the roller 12 having a tendency to descend and cause the window to rise. A movement of the point of attachment 27 along this line away from the point 15 will have the opposite effect. Thus by properly selecting and proportioning the parts, the window may be substantially balanced in all positions, or may be given a tendency to open or close, which tendency will be substantially uniform in all positions. The wheels 21 and 23 are so proportioned and positioned that the friction between them and the cable will be great enough to prevent the cable slipping on the wheel 21. The window may be raised or lowered by turning hand wheel 22, or by any other approved means.

It is obvious that many changes may be made in the construction of this device without departing from the spirit of my invention, and that mechanism embodying the principles of this construction may be designed to support any other desired weight by means of springs in any position between predetermined limits, or to apply a constant or varying pressure throughout a predetermined path.

Having now described my construction, what I claim as my invention and desire to secure by Letters Patent is:—

1. The combination with a closure and its frame, of a lever, a support for one end of the lever, a pivot connecting the lever to the support, a pulley mounted in the frame, a cable passing over the pulley and connecting the lever with the closure so that a movement of one may be imparted to the other, means for applying stress to the cable to cause the closure to move, a spring having one of its ends secured to the lever support at one side of the line joining the ends of the lever, and its opposite end secured to the lever at a point on the opposite side of the line joining the ends of the lever, and beyond the foot of the perpendicular let fall from the pivot to the center line of the spring.

2. The combination with a closure and its frame, of a lever, a support for one end of the lever, a pivot connecting the lever to the support, a rotatable member mounted on the frame, a flexible member in engagement with the rotatable member and connecting the lever with the closure so that a movement of one may be imparted to the other, means for imparting angular movement to the rotatable member, whereby stress is applied to the flexible member and the closure caused to move, a spring having one of its ends secured to the lever support at one side of the line joining the ends of the lever, and its opposite end secured to the lever at a point on the opposite side of the line joining the ends of the lever.

3. The combination with a closure and its frame of a lever, a support for one end of the lever, a pivot connecting the lever to the support, a rotatable member mounted in the frame, a guide also mounted on the frame, a flexible member in engagement with the guide and with the rotatable member and connecting the lever with the closure so that a movement of one may be imparted to the other, means for imparting angular movement to the rotatable member, whereby stress is applied to the flexible member and the closure caused to move a spring having one of its ends secured to the lever support at one side of the line joining the ends of the lever, and its opposite end secured to the lever at a point on the opposite side of the line joining the ends of the lever.

4. The combination with a closure and its frame, of a lever, a support for one end of the lever, a pivot connecting the lever to the support, a pair of spaced guide wheels mounted in the frame, a friction wheel mounted in the frame between the guide wheels, a flexible member in engagement with the guide wheels and with the friction wheel and connecting the lever with the closure so that a movement of one may be imparted to the other, means for imparting angular movement to the friction wheel, a spring having one of its ends secured to the lever support at one side of the line joining the ends of the lever, and its opposite end secured to the lever at a point on the opposite side of the line joining the ends of the lever.

In testimony whereof I have signed this specification in the presence of two subscribing witnesses.

ERNEST E. SWEET.

Witnesses:
 B. DONAHUE,
 DANL. B. SMITH.